UNITED STATES PATENT OFFICE.

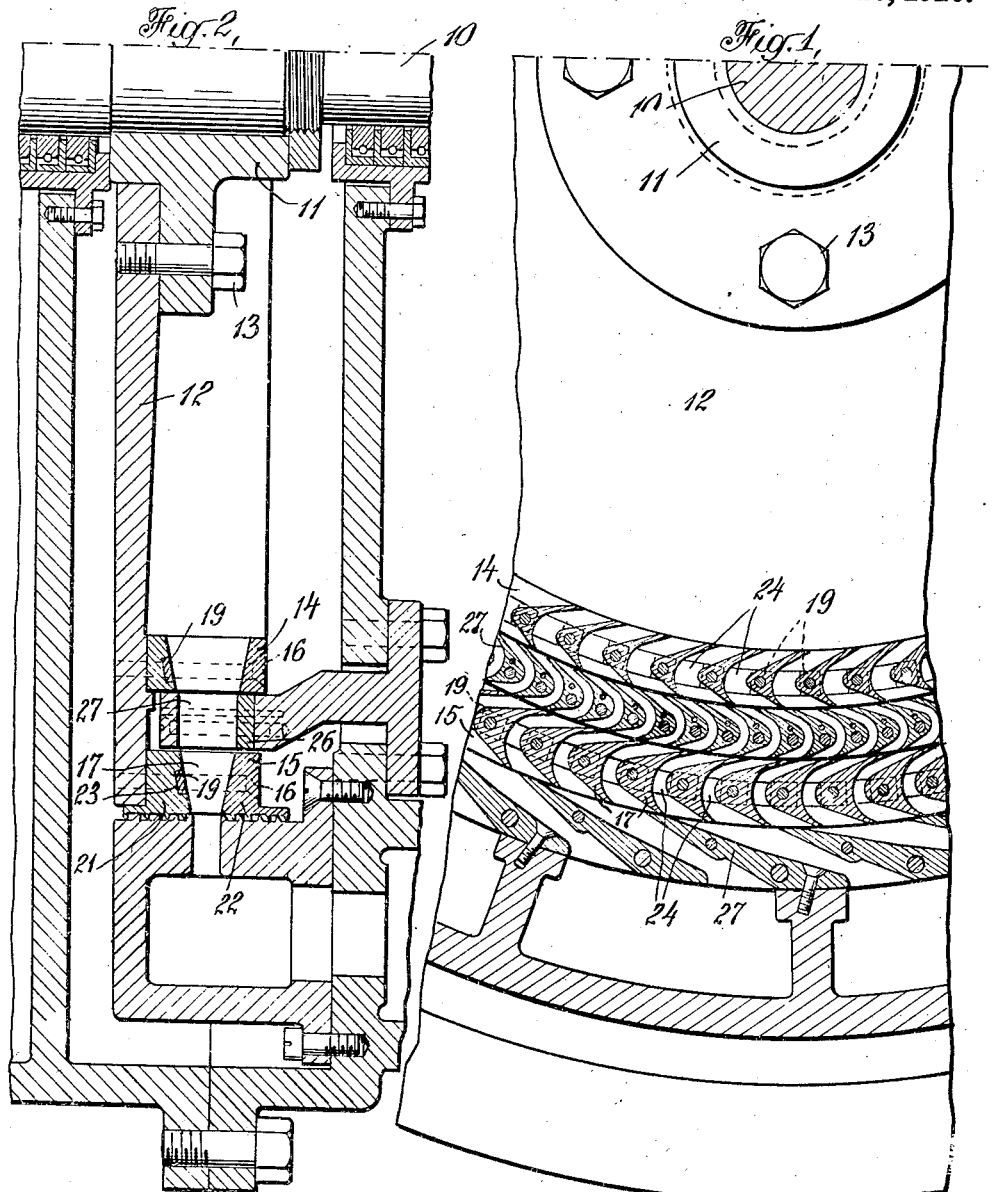

BENGT G. BROLINSON, OF NEW YORK, N. Y., ASSIGNOR TO THE UNIVERSAL TURBINE COMPANY, OF NEWARK, NEW JERSEY, A CORPORATION OF NEW JERSEY.

STEAM-TURBINE.

1,359,227.   Specification of Letters Patent.   Patented Nov. 16, 1920.

Application filed December 11, 1918. Serial No. 266,289.

*To all whom it may concern:*

Be it known that I, BENGT GUSTAF BROLINSON, a subject of the King of Sweden, and a resident of New York, county and State of New York, have invented certain new and useful Improvements in Steam-Turbines, of which the following is a specification, reference being had to the accompanying drawings, forming a part thereof.

My invention relates to steam turbines and similar fluid engines and it has special reference to rotor blades for radial flow machines, and to means for holding the same in position.

One object of my invention is to provide a simple and durable blade for turbines of the class above indicated, and an effective means for fastening the individual blades in place so that they cannot turn or work loose and may support the load and resist centrifugal forces exerted upon them.

In order that my invention may be thoroughly understood, I will now proceed to describe the same in the following specification, and will then point out the novel features thereof in appended claims.

Referring to the drawings:

Figure 1 is a transverse sectional elevation showing a portion of a radial flow turbine constituting an embodiment of my invention and arranged and constructed to include my improved blade.

Fig. 2 is a section taken in a radial plane showing a portion of the same machine.

Figs. 3 and 4 are detail views of the blade, drawn to a larger scale.

Fig. 5 is a perspective view of one of the filling or spacing pieces.

Fig. 6 is a view corresponding to Fig. 3 of a slightly modified blade structure embodying my invention.

In the drawings, 10 designates the turbine shaft to which a rotor hub 11 is keyed. The rotor disk 12 is secured to the hub by bolts 13 and carries near its periphery a pair of blade rings 14 and 15 which are held in place by bolts 16. The blade ring 15 comprises a plurality of blades 17 which are shaped in transverse section as shown in Fig. 1, and are tapered radially as shown at Fig. 2. Each blade has a sector-shaped lug 19 and is perforated at 20 to receive one of the bolts or rivets 16.

The blades are assembled between annular members 21 and 22 having the adjacent surfaces beveled to coöperate with the tapered sides of the blades. The annular member 21 has an annular groove 23 into which the lugs 19 of the blades extend. The arrangement of parts is such that one of the bolts 16 extends through each of the blades and through the annular members 21 and 22 into the disk 12, so that the blade ring is not only secured to the rotor disk but its parts are also firmly clamped together by the bolts.

The groove 23 which is annular as above described, is filled between the lugs 19 of adjacent blades by spacing pieces 24. As clearly indicated in Fig. 1, these filling or spacing pieces extend under the edges of the blades and consequently they are firmly held in place without any bolts, rivets or other independent securing means.

While my invention is well adapted for holding the blades of a turbine rotor in position, it may of course be utilized for holding stationary instead of rotating blades.

In the structure illustrated the blade ring 14 is spaced from the blade ring 15 and is similar to it in construction, and is similarly secured to the rotor disk 12. A stationary blade ring 26 is disposed between the spaced blade rings 14 and 15 and is provided with stationary deflecting blades 27.

The groove may be dovetailed—having its sides undercut—and the projections and filling or spacing pieces will be formed to correspond with and fit into the groove. This arrangement with the lugs of both sides of the blades is shown in Fig. 6.

What I claim is:

1. A blade ring comprising a pair of spaced annular members with adjacent inwardly flaring surfaces, annular grooves therein, the sides of which are normal to said flaring surfaces, a plurality of blades with flaring sides interposed between the annular members, each having integral sector-shaped lugs with concentric sides normal to the flaring sides of the blades adapted to fit the grooves in the annular members, and fastening devices passing through the members and blades and through said lugs.

2. A blade ring comprising a pair of spaced annular members with adjacent inwardly flaring surfaces, annular grooves therein, the sides of which are normal to said flaring surfaces, a plurality of blades with flaring sides interposed between the annular members, each having integral sector-shaped lugs with concentric sides normal to the flaring sides of the blades adapted to fit the grooves in the annular members, spacing pieces disposed in said grooves between the lugs of said blades extending under the edges of adjacent blades and filling the grooves between the lugs, and fastening devices passing through the members and blades and through said lugs.

In witness whereof, I have hereunto set my hand this 27″ day of November, 1918.

BENGT G. BROLINSON.